United States Patent [19]

Mackenroth, III

[11] Patent Number: 4,511,925

[45] Date of Patent: Apr. 16, 1985

[54] HIGH INTENSITY ULTRAVIOLET LIGHT VIDEO IMAGING APPARATUS

[76] Inventor: Joseph R. Mackenroth, III, 8117 McArthur Dr., Harahan, La. 70123

[21] Appl. No.: 408,429

[22] Filed: Aug. 16, 1982

[51] Int. Cl.³ .................... G03B 27/70; H04N 5/76
[52] U.S. Cl. ............................ 358/244; 358/345; 369/121; 369/125; 346/107 R; 346/110 R; 354/76; 355/20
[58] Field of Search ............... 358/244.1, 244, 345, 358/244.2; 369/121, 125; 346/107 R, 110 R; 354/76; 355/20

[56] References Cited

U.S. PATENT DOCUMENTS

| | | | |
|---|---|---|---|
| 3,184,753 | 5/1965 | Koster | 358/244 X |
| 3,198,067 | 8/1965 | Gabor | 88/24 |
| 3,400,632 | 2/1966 | Wahli | 88/24 |
| 3,673,936 | 7/1972 | Stone, Jr. et al. | 95/12 |
| 3,677,146 | 7/1972 | Nielsen | 95/1.1 |
| 3,700,329 | 10/1972 | Mason | 355/81 |
| 3,819,264 | 6/1974 | Voorhees | 355/43 |
| 3,836,926 | 9/1974 | Seitz et al. | 95/12 |
| 3,984,187 | 10/1976 | Bestenreimer et al. | 355/80 |
| 4,067,650 | 1/1978 | Spence-Bate | 355/20 |
| 4,068,941 | 1/1978 | Spence-Bate | 355/5 |
| 4,080,058 | 3/1978 | Stephany et al. | 355/14 |
| 4,209,251 | 6/1980 | Schroeder et al. | 355/110 |
| 4,246,605 | 1/1981 | La Russa | 358/104 |
| 4,265,532 | 5/1981 | McIntosh | 355/20 |

Primary Examiner—Robert L. Richardson
Attorney, Agent, or Firm—Charles C. Garvey

[57] ABSTRACT

A method and apparatus for producing a high intensity, ultraviolet, electronic video image is provided. The apparatus includes an electronic video imaging tube for printing on vesicular microfilm, diazo microfilm, and diazo paper and the like. The tube is constructed of a housing having an interior with an electron gun emitting a scanning electron beam across a path which intersects the interior of the housing. A phosphor target of ultraviolet phosphor is disposed within the housing interior and is positioned upon the path for reflecting therefrom a high intensity, ultraviolet video image. The phosphor target is preferably convex, and concentric with a curved surface portion of the housing. The curved surface portion of the housing reflects the high intensity, ultraviolet video image from the interior of the housing to the exterior portion thereof. A reduction lens assembly can be provided for diverging or converging the image as desired.

15 Claims, 4 Drawing Figures

HIGH INTENSITY ULTRAVIOLET LIGHT VIDEO IMAGING APPARATUS

BACKGROUND OF THE INVENTION

1. Technical Field

The present invention relates to video imaging tubes and more particularly relates to a method of producing a high intensity, ultraviolet electronic video image which can be used as a printing device. Even more particularly, the present invention relates to electronic video printing devices capable of producing high intensity, ultraviolet images for printing on, for example, vesicular microfilm, diazo microfilm, and diazo paper and like ultraviolet sensitive paper/film surfaces.

2. General Background

Various types of printing are available which are made on diazo paper or film. Diazo paper or film is simply paper or film having an emulsion containing a diazonium compound and a coupling or activating component. The diazo paper, film, or surface is printed upon in a process which is based on a sensitivity to ultraviolet light (e.g. 3600–4000 Angstroms). Development is by ammonia vapors, anhydrous ammonia gas, and alkaline solution which includes the coupler, or heat. Thus, the photograph, photocopy, or print is produced on the surface by coating with a photosensitive solution containing the diazo compound. The same type of ultraviolet sensitivity is present with vesicular microfilm.

Vesicular-type microfilm, diazo paper and diazo microfilm are difficult to print on from a direct electronic video source due to the high intensity of ultraviolet required to produce an image.

In the television industry, projection-type television tubes (or projection cathode ray tubes) are currently being used by a large number of manufacturers to construct projection-type color television sets. These color projection television sets use, for example, three projection tubes, each projecting a different color (one red, one blue, one green, e.g.), in order to project a proper color television picture. Different manufacturers use different types of projection tubes. See, for example, Popular Science, May 1979. Such projection-type television tubes or cathode ray tubes typically use a housing having therewithin a phosphor target which receives from an electron gun scanning electrons to produce an image on the phosphor target. The image is then reflected to a spherical mirrored portion on the inner surface of the housing which then reflects the image to the exterior portion of the gun around the outside edges of the curved phosphor target. When an electron beam strikes the face of the vacuum tube which is coated with a selected phosphor it generates the visual image of its path on an oscilloscope, radar, TV screen, or the target of a projection TV tube. Different phosphors have different characteristics of wave length emission. Phosphate and silicate face phosphors, for example, are used on the inner walls of fluorescent lamps where the exciting radiation is of shorter wave length. In the case of the U.V. imaging tube, phosphors which emit a wave length in the 3400 to 4000 Angstroms range have been selected.

Such television projection tubes are known in the art. See, for example, in the May, 1979, article in Popular Science where it is stated that a "Schmidt" optical projection TV system was constructed in the late 1950's which produced a forty-foot picture.

Various video tubes and television tubes including projection-type tubes have been patented. Further, there have been various attempts to produce on a paper surface or other media, an image as projected from a cathode ray tube or such video imaging device.

For example, U.S. Pat. No. 3,673,936 entitled "Image Copying Apparatus," provides an apparatus for producing on paper a copy of images projected onto a viewing surface such as a cathode ray tube.

A "Radiographic Reduction System" is the subject of U.S. Pat. No. 3,700,329 issued to R. P. Mason.

U.S. Pat. No. 4,068,941 issued to Spence-Bate and entitled "Microfiche Records" provides an apparatus for handling information which includes the facility of receiving the information either on microform film, a conventional document platen or from a computer input.

U.S. Pat. No. 3,677,146 issued to a A. T. Nielsen is entitled "Date Source Microfilm Recorder with Forms Overlay".

An optical simulation apparatus is the subject of U.S. Pat. No. 4,246,605. In that patent, an optical simulation apparatus uses a video target image superimposed upon an appropriately blanked off film transparency of background in order to train an observor in target tracking. The apparatus also includes means to occult all or a portion of the target image presented to the trainee by an appropriate foreground image.

U.S. Pat. No. 3,400,632 provides a method of photographic reproduction and apparatus therefore issued to A. Wahli. That patent relates to a method of photographic repodution and apparatus therefore in which a photographic negative or positive is scanned by a single light source and electrical signals are derived which are proportional to the density of each image point scanned, electrical signals being used to modify the light source in accordance with a tone correction program to provide a predetermined density range on a copying material which is exposed to the same light source as the negative or positive.

An apparatus for automatic control of intermediate image storage device in an electrostatographic processing machine, is the subject of U.S. Pat. No. 4,080,058 issued to Joseph F. Stephany, et al.

Photoprinting by intensity and velocity modulation is the subject of U.S. Pat. No. 4,265,532 issued to Walter L. McIntosh.

A method and system for production of illustrated texts is the subject of U.S. Pat. No. 3,819,264 issued to Charles Voorhees.

U.S. Pat. No. 3,198,067 provides an optical recording reproducing scanning system.

U.S. Pat. No. 4,067,650 shows a data recording microfilm camera. A microfilm data acquisition processing and storage system in which data is fed from a computer, tape or cards to a cathode ray tube from which an image is produced on the tube is projected onto a photographic film or alteratively by means of an optical switching device and image of a document located on a document planten within the apparatus can be projected onto the same film without changing the film; the cathode ray tube is provided with a coating having a spectral peak between 500 and 600 nm so as to match the spectral peak of the image on the platen.

Scanning and reproduction of pictorial images is the subject of U.S. Pat. No. 3,984,187 issued to F. Bestenreiner, et al.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
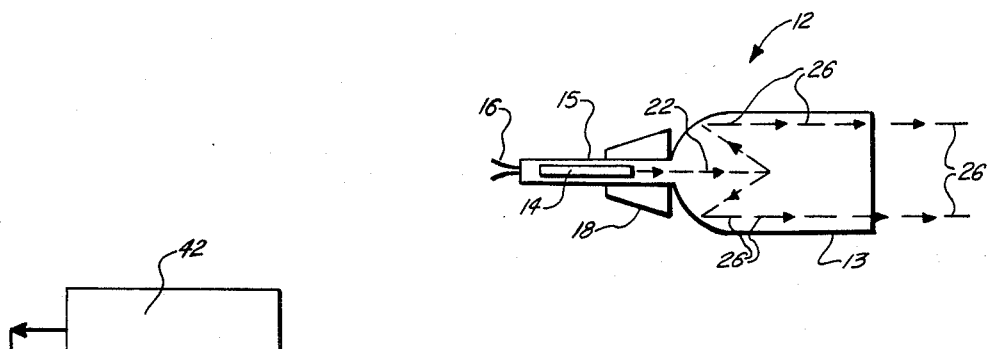
FIG. 1 is schematic illustration of a typical projection tube.

FIG. 1 shows schematically a typical projection tube 12 having an electron gun 14 portion which receives an incoming electronic video signal through line 16. A yolk 18 having a controlled magnetic field is typically provided. A tube housing 13 has a neck 15 which allows a scanning electron beam 22 to enter the interior portion of the housing 13. A curved spherical inner surface 20 is mirrored to reflect the electron beam 22 with the reflected video image being designated as 26 in the drawing. The curved disk-like phosphor target 24 is provided for reflecting the scanning electron beam 22 and generating the reflected video image 26.

Figures 2, 3:
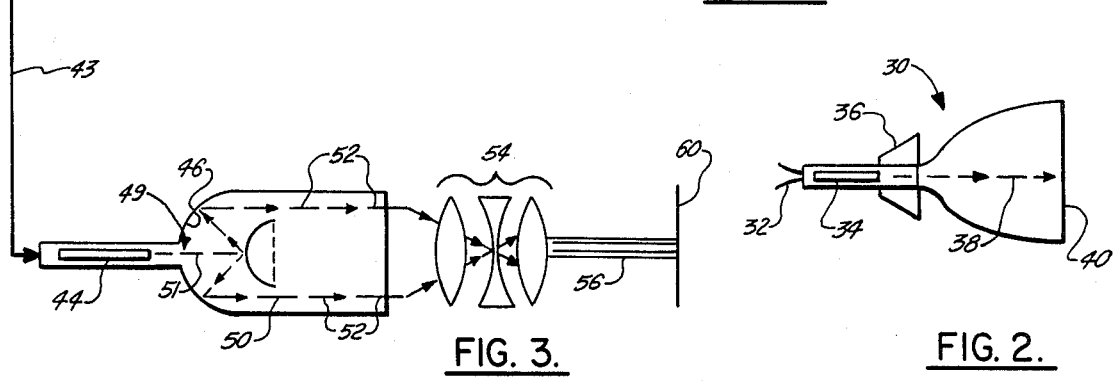
FIG. 2 is a schematic view of a conventional cathode ray tube (picture tube)
FIG. 3 is a schematic view of the preferred embodiment of the apparatus of the present invention.

In FIG. 2 there can be seen a typical cathode ray tube arrangement as used in television sets commercially. Such CRT units take in incoming signal 32 and with an electron gun 34 produce a beam 38 which is a scanning electron beam. A yolk 36 can also be seen in the drawing. A screen 40 having a phosphor coating is provided against which the beams are projected.

FIG. 3 shows the preferred embodiment of the apparatus of the present invention. In FIG. 3 there is schematically shown an electronic video source 42 which sends a signal over line 43 to electron gun 44. Housing 50 provides an interior portion receptive of scanning electron beam 51 at opening 49. The interior surface 46 of housing 50 is in part curved in like manner to projection tube 12. A phosphor target 48 is provided which is curved and disk-like. With the present invention, the phosphor target is coated with ultraviolet phosphors so that the reflected video image is in fact an ultraviolet video image. The phosphor target 48 receives the scanning electron beam 51 containing the video intellegence emitted by electron gun 44. These electrons which strike the face of the phosphor target excite the phosphors and produce a high intensity, emitted, reflected ultraviolet video image 52. The phosphor target is preferably thickly coated so that the electron beam 22 can be of a higher beam intensity. A thicker coating desireably prevents burning of the phosphor coating. The phosphors for coating target 48 are commercially available, for example, from Electronic Space Prodcuts, Inc. of Los Angeles, California (see, e.g. catalog numbers Espi-242 and Espi-242A; JEDEC Number P-24 and see also, JEDEC number P-15) Notice that surface 46 is mirrored to reflect ultraviolet video image 52. A reduction lens assembly 54 can produce a concentrated smaller ultraviolet image 56 which can be projected upon a surface 60 which can be, for example, diazo paper, diazo microfilm, or vesicular microfilm.

Figure 4:
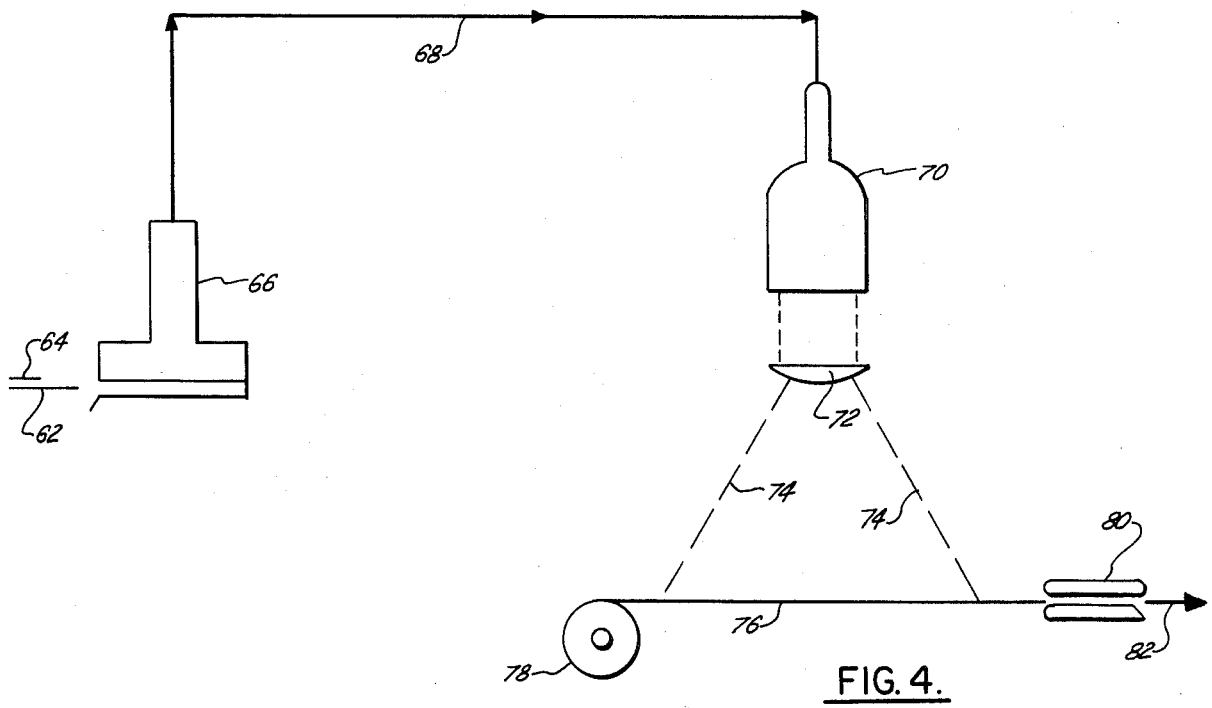
FIG. 4 is a schematic illustration of another embodiment of the apparatus of the present invention reading microfilm and printing on diazo paper.

In FIG. 4, the printed microfilm 62 bearing the image which was received from ultraviolet image or any other conventional microfilm 56 is placed into converter 66 which sends the image over line 68 to ultraviolet video projection tube 70. The image 70 can be enlarged through lens assembly 72 with the enlarged image 74 being projected upon paper 76. A supply roll 78 can be provided if desired with developer 80 producing the completed product and dispensing it therefrom as indicated by arrow 82.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An ultraviolet, video imaging tube for printing on vesicular microfilm, diazo microfilm, and diazo paper and like medium comprising:
   a. housing means having an outer wall defining therewithin an interior;
   b. electron gun means penetrating the housing wall for emitting scanning electrons into the housing means across a path intersecting the interior of the housing means; and
   c. ultraviolet phosphor target means disposed within the housing means interior, and positioned on said path for converting the scanning electrons into a reflected high intensity, ultraviolet video image which can print upon an ultraviolet sensitive medium.

2. The apparatus of claim 1 further comprising lens reduction assembly means for concentrating the high intensity, ultraviolet video image into a reduced image.

3. The apparatus of claim 1, wherein said target means is a convex, phosphor target.

4. The apparatus of claim 1 which further comprises directing means on said housing means which directs the ultraviolet video image toward the medium to be printed.

5. The apparatus of claim 3 wherein said target is a circular convex disc with its convex surface facing the incoming electronic video signal so that the signal is reflected and diverged from the target toward the housing means.

6. The apparatus of claim 1 wherein the target means is a disc having a convex surface which is coated with ultraviolet phosphor.

7. The apparatus of claim 1 wherein the projecting means is a mirrored surface portion of said housing means wall.

8. The apparatus of claim 1 further comprising an ultraviolet sensitive surface positioned to receive the ultraviolet video image thereon.

9. The apparatus of claim 8 wherein the ultraviolet sensitive surface is diazo microfilm, or a diazo paper.

10. The apparatus of claim 9 wherein the ultraviolet surface is vesicular microfilm.

11. A method of printing on ultraviolet light sensitive print media comprising the steps of:
   a. emitting a beam of scanning electrons across a beam path;
   b. placing an ultraviolet phosphor target on the path so that the emitted electrons strike the target to produce a relected ultraviolet video image;

c. printing an image on the ultraviolet light sensitive media with the reflected ultraviolet video image.

12. The method of claim 11 wherein in step "a" the electrons are in a vacuum.

13. The method of claim 11 wherein the ultraviolet light sensitive media is diazo paper.

14. The method of claim 11 wherein the ultraviolet light sensitive media is diazo microfilm.

15. The method of claim 11 wherein the ultraviolet light sensitive media is vesicular microfilm.

* * * * *